(12) United States Patent
Koch et al.

(10) Patent No.: US 9,045,214 B2
(45) Date of Patent: Jun. 2, 2015

(54) DOOR ASSEMBLY WITH TWO DOOR LEAVES

(71) Applicant: Airbus Operations GmbH, Hamburg (DE)

(72) Inventors: Maik Koch, Lilienthal (DE); Matthias Breuer, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 13/919,273

(22) Filed: Jun. 17, 2013

(65) Prior Publication Data
US 2013/0269258 A1 Oct. 17, 2013

Related U.S. Application Data

(63) Continuation of application No. PCT/EP2012/050362, filed on Jan. 11, 2012.

(60) Provisional application No. 61/436,451, filed on Jan. 26, 2011.

(30) Foreign Application Priority Data

Jan. 26, 2011 (DE) .......................... 10 2011 009 481

(51) Int. Cl.
*B64C 1/14* (2006.01)
*E06B 3/26* (2006.01)
(Continued)

(52) U.S. Cl.
CPC ........... *B64C 1/1469* (2013.01); *E05B 65/1026* (2013.01); *E05C 7/02* (2013.01); *E05F 1/10* (2013.01); *E05F 17/002* (2013.01); *E04G 5/003* (2013.01); *E05Y 2900/502* (2013.01);
(Continued)

(58) Field of Classification Search
USPC .......... 49/63, 65, 67, 68, 73.1, 100, 101, 104, 49/105, 107, 109–112, 114, 275, 326, 371, 49/61, 62; 244/129.5, 118.5, 121, 129.4
See application file for complete search history.

(56) References Cited

U.S. PATENT DOCUMENTS 234,895 A * 11/1880 Thompson .................... 49/67
617,308 A * 1/1899 Cobb .............................. 49/68
(Continued)

FOREIGN PATENT DOCUMENTS

| CH | 692250 A5 | 4/2002 |
|---|---|---|
| CN | 101018708 A | 8/2007 |

(Continued)

OTHER PUBLICATIONS

German Patent Office, Office Action for DE 10 2011 009 481.4 Mailed Aug. 4, 2011.
(Continued)

*Primary Examiner* — Katherine Mitchell
*Assistant Examiner* — Justin Rephann
(74) *Attorney, Agent, or Firm* — Ingrassia Fisher & Lorenz, P.C.

(57) ABSTRACT

A door assembly for a vehicle with two door leaves is stated. In each case the door leaves can be opened in such a manner that the maximum angle of opening between them can be limited. After a door leaf has been opened, the door leaves can thus only be pivoted together so that opening the first door leaf results in closing the second door leaf. As a result of this, access to a space in a vehicle may be controlled.

20 Claims, 5 Drawing Sheets

(51) Int. Cl.
   *E05B 65/10*   (2006.01)
   *E05C 7/02*   (2006.01)
   *E04G 5/00*   (2006.01)
   *E05F 1/10*   (2006.01)
   *E05F 17/00*   (2006.01)
   *B64C 1/00*   (2006.01)

(52) U.S. Cl.
   CPC ......... *E06B3/2605* (2013.01); *B64C 2001/009* (2013.01); *E05F 15/611* (2015.01); *E05F 15/72* (2015.01)

(56) References Cited

U.S. PATENT DOCUMENTS

| | | | | |
|---|---|---|---|---|
| 996,907 | A * | 7/1911 | Colwill | 52/198 |
| 1,005,535 | A * | 10/1911 | Gillespie | 232/43.3 |
| 1,186,263 | A * | 6/1916 | Agee | 160/96 |
| 1,470,262 | A * | 10/1923 | Henriksen | 454/273 |
| 1,602,858 | A * | 10/1926 | Sibley | 292/262 |
| 1,686,819 | A * | 10/1928 | Kirschbaum | 160/96 |
| 2,000,366 | A * | 5/1935 | Victor | 160/92 |
| 2,003,106 | A * | 5/1935 | Carlotti | 52/171.2 |
| 2,154,641 | A * | 4/1939 | Seaman | 49/40 |
| 2,163,356 | A * | 6/1939 | Solberg | 232/1 R |
| 2,226,274 | A * | 12/1940 | Winship | 49/65 |
| 2,537,896 | A * | 1/1951 | Hinton et al. | 292/1 |
| 2,662,253 | A * | 12/1953 | Winkler | 49/49 |
| 3,160,372 | A * | 12/1964 | Scott | 244/129.5 |
| 3,208,562 | A * | 9/1965 | De Vines | 49/62 |
| 3,283,443 | A * | 11/1966 | Kendrick et al. | 49/62 |
| 3,584,413 | A * | 6/1971 | Abrami et al. | 49/5 |
| 4,302,907 | A | 12/1981 | Canals et al. | |
| 4,389,817 | A * | 6/1983 | Olberding | 49/163 |
| 4,565,030 | A * | 1/1986 | LaSance | 49/44 |
| 4,598,495 | A * | 7/1986 | Labarile | 49/41 |
| 4,771,269 | A * | 9/1988 | Pasty et al. | 340/547 |
| 4,891,906 | A * | 1/1990 | Knapp | 49/65 |
| 4,891,907 | A * | 1/1990 | Rapaway | 49/67 |
| 5,474,345 | A * | 12/1995 | Clark et al. | 292/302 |
| 5,864,988 | A * | 2/1999 | Frederick, Jr. | 49/504 |
| 6,330,765 | B1 * | 12/2001 | Dahl | 49/453 |
| 6,361,430 | B2 * | 3/2002 | Kitching et al. | 454/169 |
| 6,412,225 | B1 * | 7/2002 | McManus | 49/381 |
| 6,526,694 | B1 * | 3/2003 | Cosgrove | 49/67 |
| 7,568,659 | B2 | 8/2009 | Roques et al. | |
| 7,823,834 | B2 | 11/2010 | French et al. | |
| 7,984,875 | B2 | 7/2011 | Koehn et al. | |
| 8,196,259 | B2 * | 6/2012 | Armstrong et al. | 16/66 |
| 8,490,345 | B2 * | 7/2013 | Fields | 52/202 |
| 2003/0051421 | A1 * | 3/2003 | Fields | 52/202 |
| 2003/0101652 | A1 * | 6/2003 | Cosgrove | 49/63 |
| 2004/0173327 | A1 * | 9/2004 | Steel et al. | 160/210 |
| 2007/0113478 | A1 * | 5/2007 | Chu et al. | 49/67 |

FOREIGN PATENT DOCUMENTS

| | | |
|---|---|---|
| DE | 202005006458 U1 | 7/2005 |
| DE | 102007022426 A1 | 11/2008 |
| DE | 102009005022 A1 | 7/2010 |
| FR | 2420017 A1 | 10/1979 |
| GB | 491228 A | 8/1938 |

OTHER PUBLICATIONS

International Searching Authority, International Search Report dated Jun. 5, 2012 for International Patent Application No. PCT/EP2012/050362.

State Intellectual Property Office of the People's Republic of China, Office Action for 201280003888.3, Mailed Dec. 23, 2014.

* cited by examiner

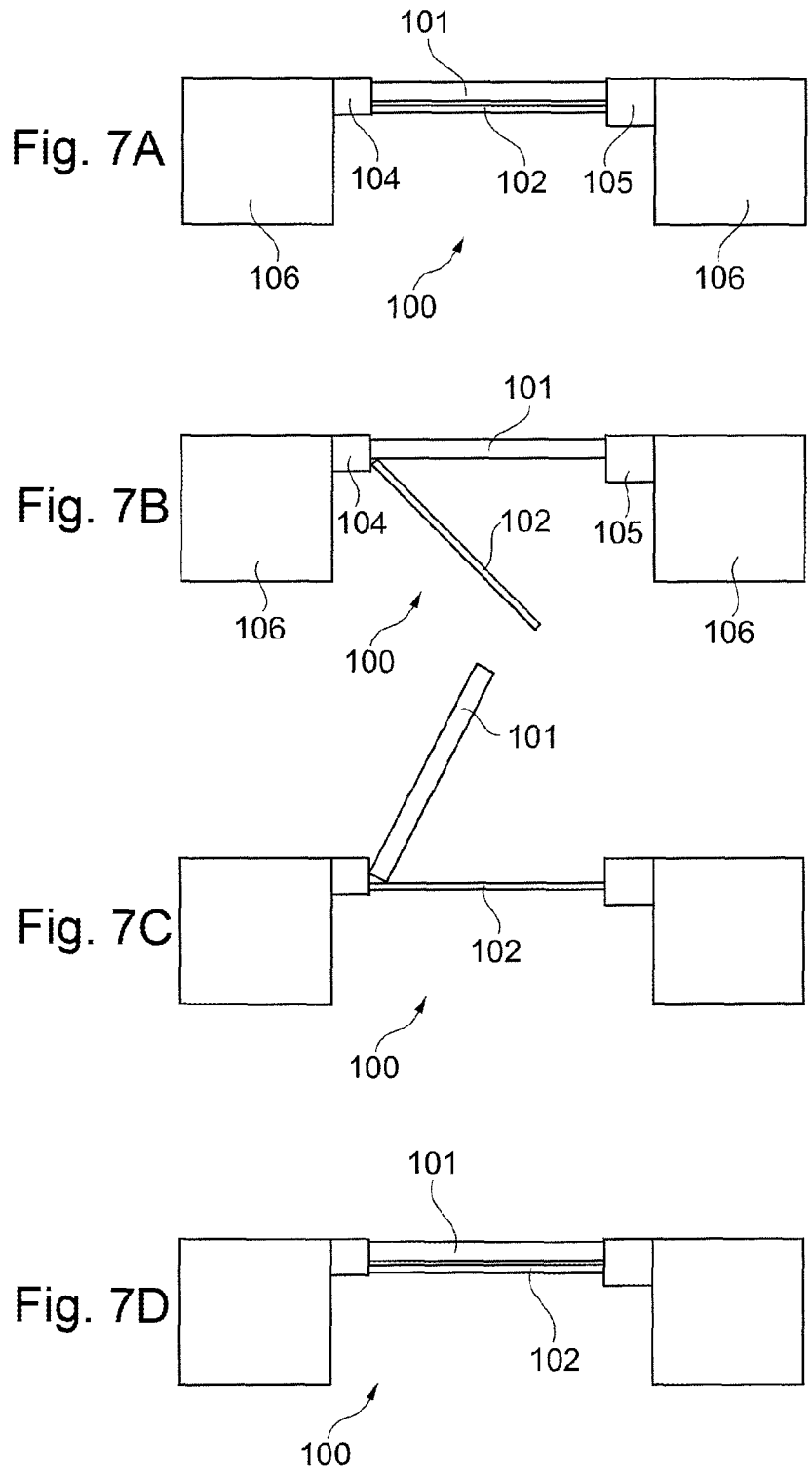

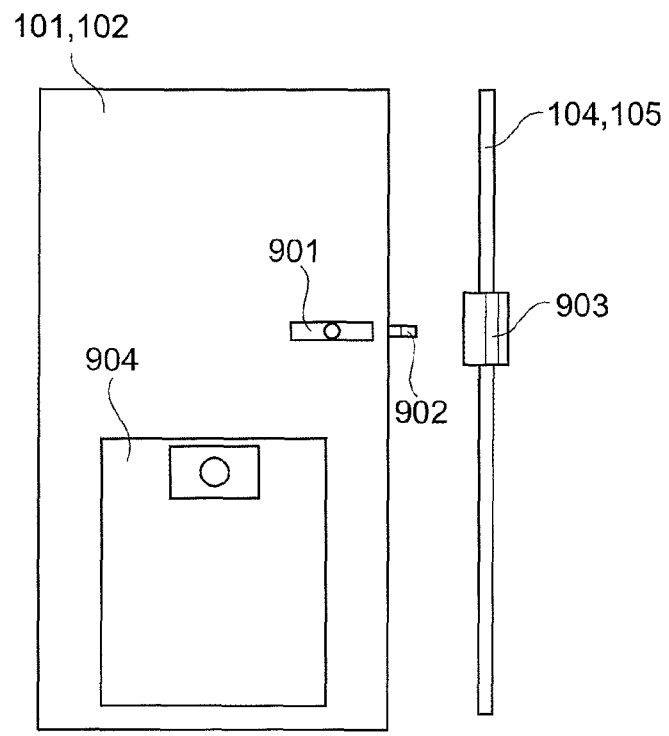
Fig. 9
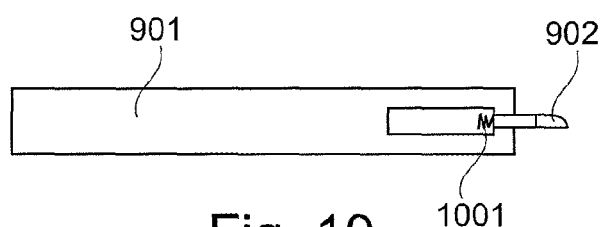
Fig. 10
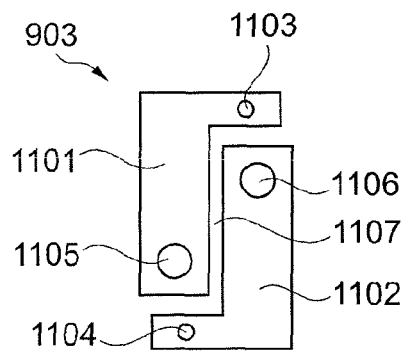
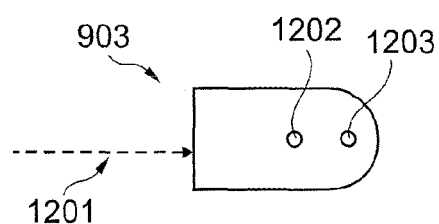
Fig. 11  Fig. 12

DOOR ASSEMBLY WITH TWO DOOR LEAVES

CROSS-REFERENCE TO RELATED APPLICATIONS

This is a continuation of International Application No. PCT/EP2012/050362, filed Jan. 11, 2012, which application claims priority to German Patent Application No. 10 2011 009 481.4, filed Jan. 26, 2011, and to U.S. Provisional Patent Application No. 61/436,451, filed Jan. 26, 2011, which are each incorporated herein by reference in their entirety.

TECHNICAL FIELD

The technical field relates to door assemblies. In particular, the technical field relates to door assemblies for a space in a means of transport, to a means of transport with a door assembly, and to a method for obtaining access to a space of a means of transport.

BACKGROUND

Door assemblies on board aircraft on the one hand are used to separate various spaces from each other, and on the other hand also meet safety or security aspects. Dangers which are to be prevented by safety or security aspects can arise on the one hand as a result of accidents, and on the other hand as a result of persons.

U.S. Pat. No. 7,823,834 B2 describes a door assembly that controls an airflow.

U.S. Pat. No. 7,568,659 B2 describes a door for the cockpit of an aircraft, which door for pressure equalization between the cockpit and the passenger space comprises a device for pressure equalization.

For the purpose of controlling access to the cockpit, many door assemblies comprise electronic security mechanisms, for example a keypad, for the entry of an access code, wherein passing through the door assembly becomes possible only after verification of the access authorization.

In addition, other objects, desirable features and characteristics will become apparent from the subsequent summary and detailed description, and the appended claims, taken in conjunction with the accompanying drawings and this background.

SUMMARY

Accordingly, various embodiments of the present disclosure provide a door assembly that improves the security of access to a cockpit.

Many of the characteristics described below with reference to the door assembly can also be implemented as a method and vice versa.

According to one of various aspects of the present disclosure, a door assembly for a space in a means of transport is stated, which door assembly comprises a first door leaf and a second door leaf. Furthermore, the door assembly comprises a limitation device for limiting the maximum angle of opening of the first door leaf relative to the second door leaf. In this arrangement the limitation device is designed in such a manner that the maximum angle of opening of the first door leaf relative to the second door leaf is adjustable independently of an angle of the second door leaf relative to a door frame of the door assembly. Furthermore, for the purpose of adjusting the angle of opening that the two door leaves encompass, the first door leaf and the second door leaf are pivotally held relative to each other.

This arrangement may make it possible, for example, to limit the number of persons that can pass through the door assembly in a predetermined period of time.

By limiting the maximum angle of opening of the first door leaf relative to the second door leaf, as well as by the pivotal bearing arrangement of the first door leaf and of the second door leaf it may be ensured that in one step only that number of persons can pass through the door assembly, for which number there is room in the space between the first door leaf and the second door leaf. To allow further persons to pass through the door assembly, the first door leaf and the second door leaf must again be moved to the previous position so as to allow passage through.

In each case the maximum angle of opening between the first door leaf and the second door leaf is smaller than about 180°. The minimum size of the angle of opening between the first door leaf and the second door leaf must be such that the space resulting between the first door leaf and the second door leaf makes it possible to pass through the door assembly. In this arrangement, in particular the dimensions of the persons passing through are to be taken into account. Furthermore, when determining the minimum size of the angle of opening it must be ensured that it is possible for the persons situated in the space to be able to carry out the step sequence necessary for passing through the door assembly; in other words that they have adequate room for movement.

The limitation device for limiting the maximum angle of opening of the first door leaf relative to the second door leaf may ensure that opening the second door leaf results in closing the first door leaf. To this effect, in particular, maximum angles of opening of the first door leaf relative to the second door leaf of about 90° or less are suitable.

According to one embodiment of the present disclosure, the maximum angle of opening of the first door leaf relative to the second door leaf is about 60°. In the case of correspondingly large or correspondingly shaped door leaves the maximum angle of opening can also be less, e.g. about 50° or about 45°.

According to one of various embodiments of the present disclosure, there is a damper between the first door leaf and the second door leaf. The damper can be designed to ensure closing of the first door leaf and of the second door leaf in a damped manner.

The damper can, furthermore, be designed to limit the maximum angle of opening of the first door leaf relative to the second door leaf. Apart from this, including individually and independently of any damper, a chain can be used as a limitation device. Furthermore, other materials that due to their characteristics and strength are suitable for this purpose can be used as a limitation device. This can, for example, include: a textile strap, a plastic strap, other straps with or without woven-in elements for reinforcing the tensile strength, or a metal element comprising a slit-shaped running rail that makes it possible to vary the opening angle of the first door leaf relative to the second door leaf.

However, it may also be possible, for example, to use a C-shaped metal bracket or a chain or a wire cable as a limitation device. The bracket can also comprise materials other than metal, wherein care should be taken that the bracket comprises a corresponding strength to prevent the maximum angle of opening of the first door leaf relative to the second door leaf from being exceeded. The strength may be designed in such a manner that any specified security requirements are also met. In this arrangement the C-shaped bracket is affixed in such a manner that an angle of opening of a first limb and of a second limb of the bracket determines the maximum angle of opening of the first door leaf relative to the second door leaf.

Furthermore, the damper may be designed in such a manner that at the same time it serves as a limitation device.

Linear dampers or rotational dampers can be used as dampers, as can other dampers that are suitable to ensure damped closing of the first door leaf and of the second door leaf, and/or to serve as a limitation device for limiting a maximum angle of opening of the first door leaf relative to the second door leaf.

According to one embodiment of the present disclosure, at least one door leaf comprises a protrusion, e. g. in form of a curved surface. In this arrangement the protrusion is designed in such a manner that the region between the first door leaf and the second door leaf is enlarged.

The protrusion may make it possible to take along bulky objects through the door assembly, and it may also make it easier to walk through the door assembly. The protrusion may make it possible for the first door leaf and the second door leaf to be arranged side-by-side on a door frame and for the door assembly to nevertheless comprise a large passage area because the region between the first door leaf and the second door leaf is enlarged as a result of the protrusion.

According to one exemplary embodiment of the present disclosure, the limitation device is removable.

After removal of the limitation device both the first door leaf and the second door leaf can be opened separately. Thus the passage area of the door assembly is completely open and no longer restricts the passage. This can, for example, be necessary in the case of emergency evacuation of a cockpit, but also for the transport of bulky materials, for example in the case of maintenance work in a cockpit or in the case of assembly or disassembly of items of equipment in a cockpit.

According to one embodiment of the present disclosure, the door assembly further comprises an actuator. In this arrangement the actuator is arranged for opening the first door leaf and/or the second door leaf.

The actuator can be a motor, a hydraulic element or an energy-storing element, for example a spring.

According to one exemplary embodiment of the present disclosure, at least one door leaf of the door assembly is a security door.

The above can be a security door from the field of aircraft construction, which security door is known from the state of the art. Of course, the two door leaves can also be door leaves of a security door.

According to one of various embodiments of the present disclosure, at least one door leaf comprises a locking device that can be operated both from the front of the door leaf and from the rear of the door leaf. This may make it possible for persons to walk through the door assembly in two directions of passing through.

According to one embodiment of the present disclosure, the first door leaf and the second door leaf are interconnected by means of a hinge.

According to one of various aspects of the present disclosure, a means of transport is stated, for example an aircraft, helicopter, airship, bus, railroad vehicle, boat or ship comprising a door assembly as described above and below.

According to one exemplary embodiment of the present disclosure, the means of transport is designed as an aircraft, with the door assembly being used to separate the cockpit from the passenger space.

According to one embodiment of the present disclosure, the door assembly comprises at least one decompression device. In one embodiment of the decompression device at least one door leaf comprises at least one predetermined breaking point so that, for example in the case of rapid decompression in a cockpit or in a passenger space, rapid pressure equalization becomes possible.

In the case of a decrease in pressure in one of the spaces separated by the door assembly it is particularly important that pressure equalization can take place. To this effect the design according to the present disclosure of the door assembly necessitates special measures, for example the aforesaid at least one predetermined breaking point, because said spaces are separated by two door leaves.

The predetermined breaking point or breaking area can, for example, be arranged on a trap door that is built into the door leaf.

However, the predetermined breaking point can also be arranged in a locking engagement device, in a locking catch or at some other position of the door leaf.

Of course it is also possible to combine decompression devices other than the above-described decompression device with the door assembly.

According to one aspect of the present disclosure, a method for providing access to a space of a means of transport with the use of a door assembly with a first door leaf and a second door leaf is stated. The method described starts from the state in which both the first door leaf and the second door leaf are closed, and provides for the first door leaf to be opened against the direction of passing through the door assembly, a maximum angle of opening of the first door leaf relative to the second door leaf is limited, the first door leaf and the second door leaf are pivoted in the direction of passing through so that the first door leaf closes off a door passage, and finally locking of the second door leaf.

By means of this method the number of persons who can pass through the door assembly in a given period of time is limited.

In this manner, in particular, flight security and safety may be improved.

It can assist in the use of a door assembly according to the present disclosure if both on the front and on the rear of the door assembly a signal generator is affixed, which shows that the door assembly is being entered on the respective opposite side. In other words, the signal generator on the front of the door assembly emits a signal if the door leaf on the rear of the door assembly is being operated. Visual, acoustic or mechanical measures can be used as a signal generator, for example a light, a tone generator or a lever that changes its position when a door leaf is moved, e.g. opened.

Such a signal generator prevents the door assembly from being operated and/or entered from two sides at the same time.

According to one embodiment of the present disclosure, the method for using a door assembly as described above and below furthermore comprises the second door leaf being unlocked. In this process unlocking of the second door leaf takes place after limitation of the maximum angle of opening of the first door leaf relative to the second door leaf.

By means of this step it may be ensured that the process of passing through the door assembly commences only when the maximum angle of opening of the first door leaf relative to the second door leaf has been reached.

According to one of various embodiments of the present disclosure, the method for gaining access to a space of a means of transport with the use of a door assembly with a first door leaf and a second door leaf further comprises the following: locking the first door leaf relative to a position of the second door leaf, and releasing the locking mechanism of the first door leaf.

In this process, locking takes place after opening the first door leaf against the direction of passing through the door assembly and before pivoting the first door leaf and the second door leaf. This prevents the first door leaf, as a result of its pivoting movement, from bumping against a person passing through.

Furthermore, releasing the locking mechanism needs to take place after pivoting the first door leaf and the second door leaf and before closing the second door leaf.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein:

FIGS. 7A-7D show the steps for passing in one passage direction through the door assembly according to an exemplary embodiment of the present disclosure.

FIG. 9 shows a door leaf with a locking device, a locking catch and a trap door, as well as a door frame with a locking engagement device according to an exemplary embodiment of the present disclosure.

FIG. 10 shows a locking device with a locking catch.

FIG. 11 shows an exemplary embodiment of a locking engagement device.

FIG. 12 shows another exemplary embodiment of a locking engagement device.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
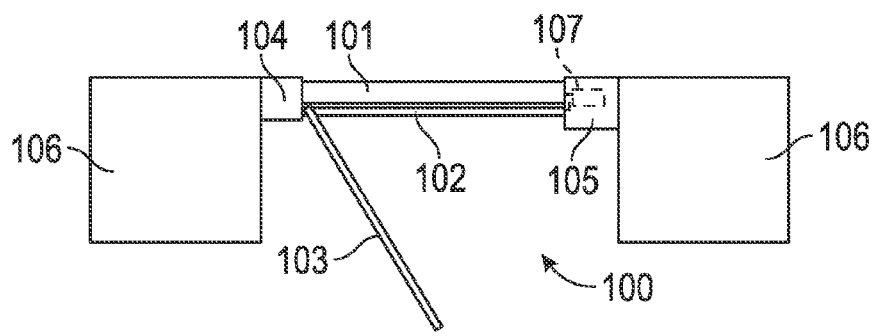
FIG. 1 shows a door assembly according to an exemplary embodiment of the present disclosure for a space of a means of transport.

FIG. 1 shows a door assembly 100 for a space of a means of transport according to an exemplary embodiment of the present disclosure. The door assembly 100 comprises a first door leaf 101 and a second door leaf 102, 103. Furthermore, the door assembly 100 comprises a door frame 104, 105. The door frame 104, 105 is anchored in the vehicle wall 106.

The second door leaf is shown in a closed state 102 and in an open state 103. According to one embodiment of the present disclosure, the door assembly 100 further comprises an actuator 107. In this arrangement the actuator 107 is arranged for opening the first door leaf 101 and/or the second door leaf 102/103. The actuator 107 can be a motor, a hydraulic element or an energy-storing element, for example a spring.

Even if the door leaves 101, 102/103 according to FIG. 1 are attached in such a manner that the angle of opening results on the door frame 104, the door assembly according to the present disclosure also covers attachment of door leaves 101, 102/103 in such a manner that the angle of opening results on the door frame 105. In other words this means that the door stop can be situated either on the left-hand side or on the right-hand side of a door frame 104, 105, relative to a direction of passing through the door frame.

Figure 2A:
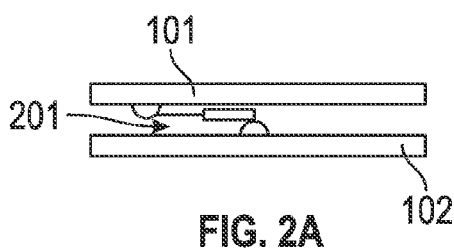
FIGS. 2A-2C show different positions of a first door leaf and a second door leaf according to an exemplary embodiment of the present disclosure, which door leaves are interconnected by way of a damper.
Figure 2C:
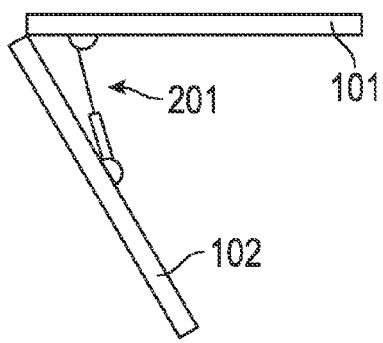
Figure 2B:
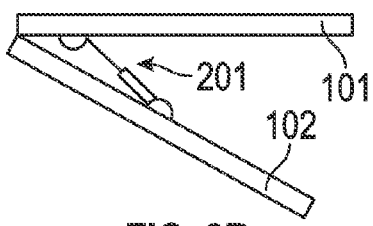

FIGS. 2A-2C show another exemplary embodiment of the present disclosure. In this arrangement the first door leaf 101 is connected to the second door leaf 102 by way of a damper 201.

FIG. 2A shows the first door leaf 101 and the second door leaf 102, each in its closed state. FIG. 2B and FIG. 2C show the first door leaf 101 and the second door leaf 102 with a different angle of opening of the first door leaf relative to the second door leaf.

In this arrangement the damper 201 can ensure closing in a damped manner of the first door leaf and of the second door leaf. Furthermore, the damper 201 can be used to limit a maximum angle of opening of the first door leaf relative to the second door leaf.

Figure 3:
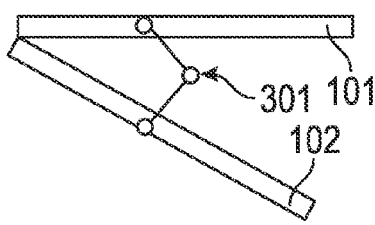
FIG. 3 shows a first door leaf and a second door leaf according to an exemplary embodiment of the present disclosure, which door leaves are connected by way of a tensioning arm with a rotational damper.

FIG. 3 shows a first door leaf 101 and a second door leaf 102, connected by way of a tensioning arm with a rotational damper 301.

In this arrangement the rotational damper 301, in precisely the same manner as, for example, the linear damper 201, can assume the task of ensuring closing the first door leaf and the second door leaf in a damped manner and of limiting the maximum angle of opening of the first door leaf relative to the second door leaf.

Figure 4:
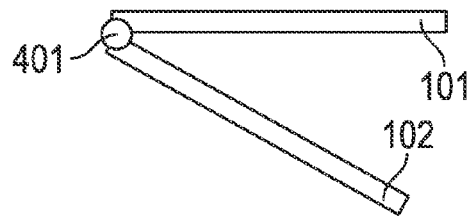
FIG. 4 shows a first door leaf and a second door leaf according to an exemplary embodiment of the present disclosure, which door leaves are connected by way of a rotational damper in the hinge.

FIG. 4 shows a first door leaf 101 and a second door leaf 102, connected by way of a rotational damper 401. In this arrangement the rotational damper 401 is arranged in a hinge that interconnects the first door leaf 101 and the second door leaf 102. As is the case in the preceding exemplary embodiments, it is also possible to use the rotational damper 401 to limit a maximum angle of opening of the first door leaf relative to the second door leaf.

Figure 5:
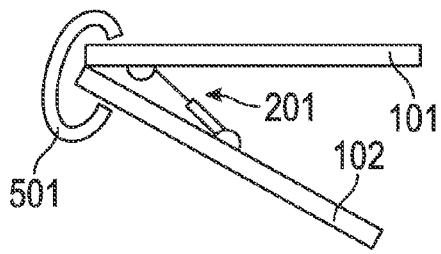
FIG. 5 shows a first door leaf and a second door leaf according to an exemplary embodiment of the present disclosure, which door leaves are connected to a damper and to a limitation device of the angle of opening.

FIG. 5 shows a further exemplary embodiment of the present disclosure. In this arrangement a C-shaped bracket 501 is arranged in such a manner that its limbs are used to limit the maximum angle of opening of the first door leaf 101 relative to the second door leaf 102. Furthermore, a linear damper 201 is arranged between the first door leaf 101 and the second door leaf 102.

In this exemplary embodiment the maximum angle of opening of the first door leaf relative to the second door leaf can be limited jointly by the C-shaped bracket 501 and the damper 201.

The combination, shown in this illustration, of a C-shaped bracket 501 and a damper 201 is, of course, not exclusive. Other dampers can also be used in cooperation with the C-shaped bracket 501; however, instead of, or as a supplement to, the damper it is also possible for further mechanisms for limiting the maximum angle of opening, as described above, to be attached between the first door leaf 101 and the second door leaf 102.

Figure 6:
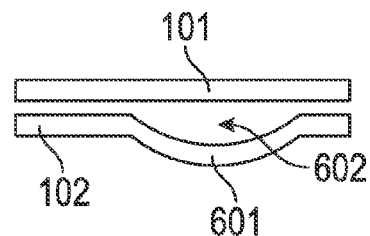
FIG. 6 shows a door leaf with a protrusion according to an exemplary embodiment of the present disclosure.

FIG. 6 shows a first door leaf 101 and a second door leaf 102 according to another exemplary embodiment of the present disclosure. In this arrangement the second door leaf 102 comprises a protrusion 601, i.e. a curved surface, so as to provide an enlarged passage area 602.

The protrusion can, of course, also be attached to the first door leaf 101 as well as to both door leaves 101, 102.

FIGS. 7A-7D show the method that is necessary for a person to pass through a door assembly according to an exemplary embodiment of the present disclosure.

FIG. 7A shows a door assembly 100 according to an exemplary embodiment of the present disclosure. In this arrangement both the first door leaf 101 and the second door leaf 102 are in a closed state in the door frame 104, 105 that is anchored in the vehicle wall 106.

FIG. 7B shows the second door leaf 102 in an open state so that as a result of the angle of opening between the first door leaf 101 and the second door leaf 102 a passage area results. In this state the passage area is on the front of the door assembly 100.

FIG. 7C shows the positions of the first door leaf 101 and of the second door leaf 102 after pivoting the first door leaf 101 and the second door leaf 102 so that it is now possible to step out of the passage area between the first door leaf 101 and the second door leaf 102, which passage area is now on the rear of the door assembly 100.

FIG. 7D shows the first door leaf 101 and the second door leaf 102 in the closed state on completion of the procedure of passing through the door assembly 100. The position of the first door leaf 101 and of the second door leaf 102 thus again corresponds to the initial state according to FIG. 7A.

FIGS. 8A-8D show the method involved in walking through the door assembly 100 according to the present disclosure in a second direction of passage.

Figure 8A:
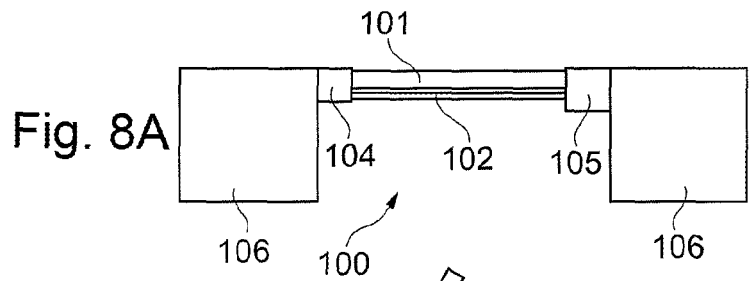
FIGS. 8A-8D show the steps for passing in the other passage direction through the door assembly according to an exemplary embodiment of the present disclosure.

FIG. 8A shows the door assembly 100 according to an exemplary embodiment of the present disclosure, wherein the first door leaf 101 and the second door leaf 102 are situated in their closed state in a door frame 104, 105 that is anchored in the vehicle wall 106.

Figure 8B:
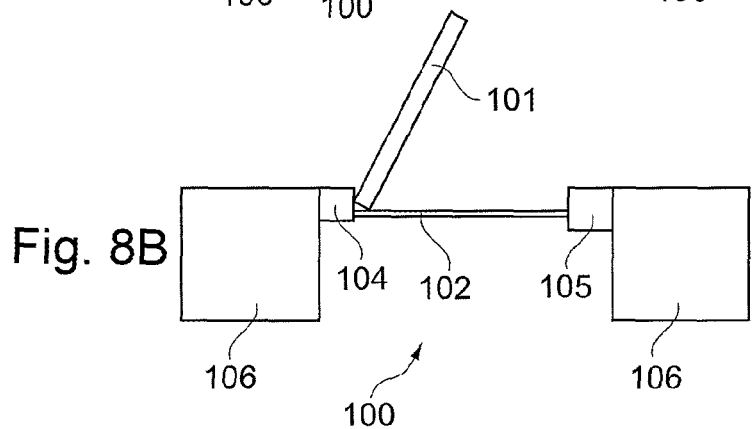

FIG. 8B shows the first door leaf 101 in an open position so that due to the angle of opening of the first door leaf 101 relative to the second door leaf 102 a passage area between the first door leaf 101 and the second door leaf 102 results. In this position the passage area is on the rear of the door assembly 100. After a person enters the passage area between the first door leaf 101 and the second door leaf 102, the first door leaf 101 and the second door leaf 102 are to be pivoted to the position shown in FIG. 8C.

Figure 8C:
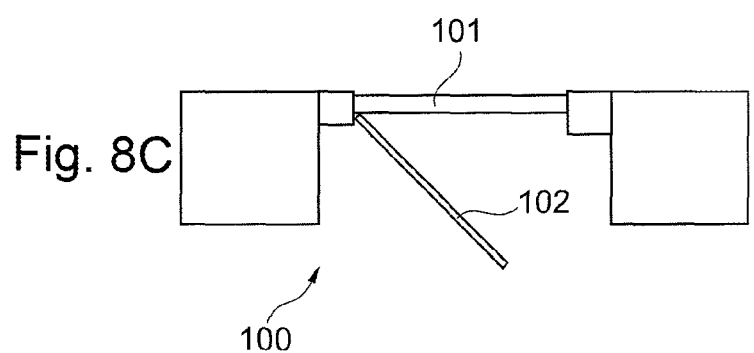

FIG. 8C shows a first door leaf 101 and a second door leaf 102, wherein the first door leaf 101 is closed and the second door leaf 102 is open. In this position the passage area is on the front of the door assembly 100. After the person has left the passage area between the first door leaf 101 and the second door leaf 102, the second door leaf 102 is closed.

Figure 8D:
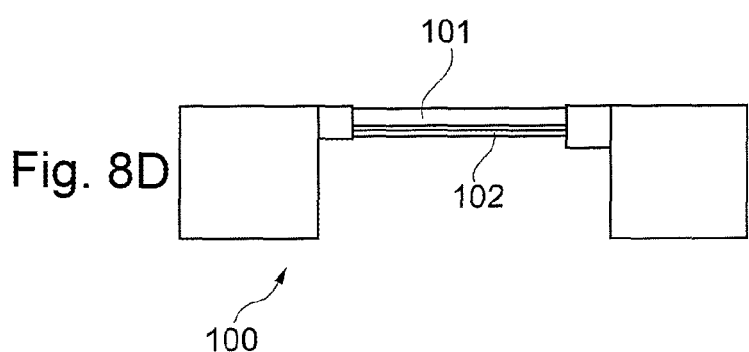

Thus the state shown in FIG. 8D is attained. Both the first door leaf 101 and the second door leaf 102 are now again in a closed state, and thus correspond to the respective positions according to FIG. 8A.

FIG. 9 shows a door leaf 101, 102 and a door frame 104, 105 according to an exemplary embodiment of the door assembly according to the present disclosure.

The door leaf 101, 102 comprises a locking device 901 and a locking catch 902, as well as a trap door 904.

The locking device 901 is connected to the locking catch 902 in such a manner that opening the door leaf is possible both from the front and from the rear of the door leaf 101, 102.

The trap door 904 is arranged so as to open in the case of decompression in one of the spaces connected to the door assembly according to the present disclosure. In this arrangement, opening the trap door 904 can take place as a result of the pressure differential on the door leaf 101, 102, which pressure differential prevails as a result of decompression. To this effect it is necessary, for example, to provide predetermined breaking points on the trap door 904.

However, predetermined breaking points can also be arranged on the locking catch 902 or in some other region of the door leaf 101, 102, for example on a hinge.

The locking engagement device 903 is arranged to hold the door leaf 101, 102 in its closed state by means of the locking catch 902.

In this arrangement the locking engagement device 903 can also comprise predetermined breaking points in case there is decompression.

FIG. 10 shows the locking device 901, wherein the locking catch 902 is pressed by a spring 1001 to a protruding position. This ensures reliable locking of the locking device 901 with the locking engagement device 903.

FIG. 11 shows an exemplary design of the locking engagement device 903 for a door assembly 100 according to an exemplary embodiment of the present disclosure.

In this arrangement the locking catch 902 is situated in the space 1107 between the locking plate 1101 and the locking plate 1102.

In this arrangement the locking plate 1101 comprises a first catch 1103 and a second catch 1105. In this arrangement at least one catch 1103, 1105 is to comprise a predetermined breaking point. Analogously, the locking plate 1102 also comprises a first catch 1104 and a second catch 1106, of which at least one is to comprise a predetermined breaking point.

In the case of decompression, the pressure acting on the door leaf 101, 102, which pressure is transmitted by way of the locking catch 902 to a locking plate 1101 or 1102, causes the catches 1103, 1105 or 1104, 1106 that comprise predetermined breaking points to break.

Since a decrease in pressure can occur on the front or on the rear of the door leaf 101, 102, the locking plates 1101, 1102 are designed in a mirror-inverted manner so that in the case of decompression the door leaf 101, 102 can swing open in either direction.

If only one catch 1103 or 1105 or 1104 or 1106 comprises at least one predetermined breaking point, in the case of decompression the respective non-broken catch serves as a pivot point for the locking plate 1101, 1102 so that it becomes possible for the door leaf 101, 102 to swing open.

FIG. 12 shows another exemplary embodiment of the locking engagement device 903 for a door assembly 100 according to an exemplary embodiment of the present disclosure.

In this arrangement the locking catch 902 engages the locking engagement device 903 in the direction of the arrow 1201. A first catch 1202 and a second catch 1203 hold the locking engagement device 903 in position. In the case of decompression and a resulting pressure on the door leaf 101, 102, which pressure is transmitted to the locking engagement device 903 by way of the locking catch 902, at least one catch 1202, 1203 that comprises at least one predetermined breaking point breaks, and consequently the locking engagement device 903 can pivot on the at most one remaining catch 1202, 1203, and the door leaf 101, 102 can be opened by the pressure that is present.

Figure 13:
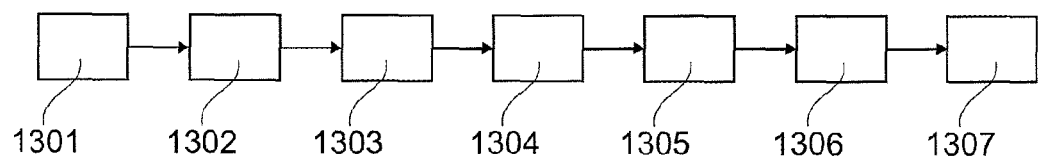
FIG. 13 shows the method for using a door assembly according to an exemplary embodiment of the present disclosure.

FIG. 13 shows the method for using a door assembly comprising a first door leaf and a second door leaf according to an exemplary embodiment of the present disclosure.

In 1301 the first door leaf is to be opened against the direction of passing through the door assembly.

In 1302 the maximum angle of opening of the first door leaf relative to the second door leaf is to be limited.

In 1303 the first door leaf is to be locked. This ensures that during subsequent pivoting of the first door leaf and of the second door leaf the first door leaf does not bump against the person who is passing through.

In 1304 the second door leaf is to be unlocked.

In 1305 the first door leaf and the second door leaf are to be pivoted in the passage direction so that the first door leaf closes off a door passage.

In 1306 the locking mechanism of the first door leaf is to be released.

In 1307 the second door leaf is to be closed.

Figure 14:
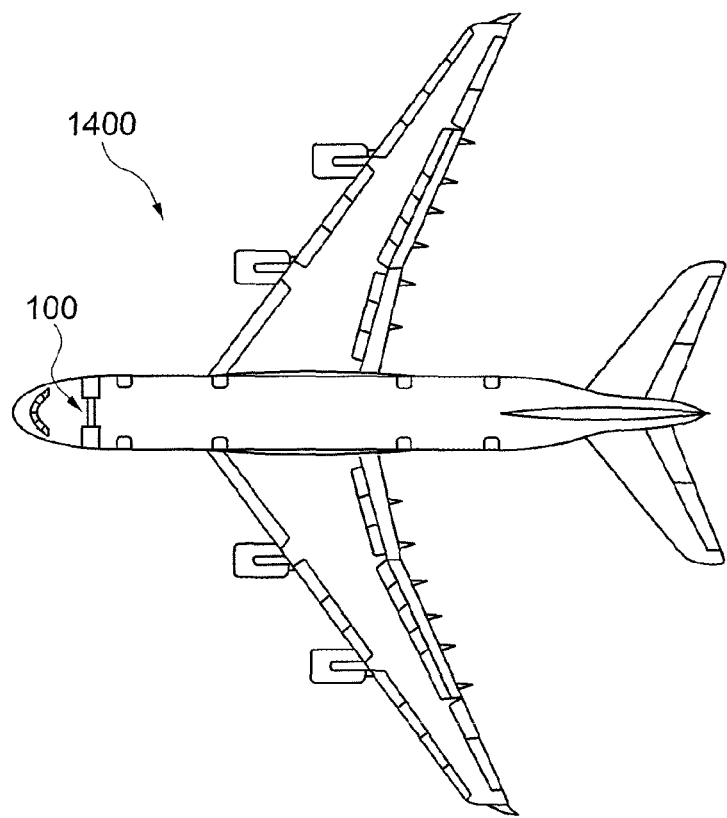
FIG. 14 shows an aircraft comprising a door assembly according to the present disclosure according to an exemplary embodiment of the present disclosure.

FIG. 14 shows the use of an exemplary embodiment of the door assembly 100 according to the present disclosure in an aircraft 1400.

In this arrangement the door assembly 100 can, in particular, separate a cockpit from a passenger space.

The door assembly 100 according to the present disclosure can, however, also be used in other vehicles, in particular in vehicles where stringent security requirements apply. This can be the case, for example, in a train, in a ship or boat.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A door assembly for granting access to a space of a means of transport, comprising:
    a first door leaf;
    a second door leaf; and
    a limitation device limiting a maximum angle of opening between the first door leaf and the second door leaf, irrespective of an angle of the second door leaf relative to a door frame,
    wherein an angle of opening between the first door leaf and the second door leaf is adjustable, the first door leaf and the second door leaf are pivotally held relative to each other,
    wherein in a closed state of the door assembly, the first door leaf can be opened by moving the first door leaf in a first direction while the second door leaf remains in a closed state,
    wherein the first door leaf and the second door leaf can be jointly pivoted in a second direction opposite to the first direction until the first door leaf closes the door assembly,
    wherein the second door leaf can be moved in the first direction to close the door assembly,
    wherein, in the closed state of the door assembly, the second door leaf can be moved in the second direction while the first door leaf remains in the closed state,
    wherein the first door leaf and the second door leaf can be jointly pivoted in the first direction so that the second door leaf closes the door assembly, and
    wherein the first door leaf can be moved in the second direction to close the door assembly.

2. The door assembly of claim 1, wherein the maximum angle of opening of the first door leaf relative to the second door leaf is about 60°.

3. The door assembly of claim 1, wherein between the first door leaf and the second door leaf there is a damper in order to ensure closing of the first door leaf and of the second door leaf in a damped manner.

4. The door assembly of claim 1, wherein at least one of the first door leaf and second door leaf comprises a protrusion in order to provide a passage area.

5. The door assembly of claim 1, wherein the limitation device is removable.

6. The door assembly of claim 1, further comprising:
    at least one actuator;
    wherein the actuator is arranged for opening at least one of the first door leaf and the second door leaf.

7. The door assembly of claim 1, wherein the first door leaf and second door leaf form a security door.

8. The door assembly of claim 1, wherein at least one of the first door leaf and second door leaf comprises a locking device operable both from a front of the respective at least one of the first door leaf and second door leaf, and from a rear of the respective at least one of the first door leaf and second door leaf.

9. The door assembly of claim 1, wherein the first door leaf and the second door leaf are interconnected by means of a hinge.

10. A means of transport, comprising:
    the door assembly of claim 1 for a space of the means of transport, including a first door leaf, a second door leaf, and a removable limitation device limiting a maximum angle of opening between the first door leaf and the second door leaf, irrespective of an angle of the second door leaf relative to a door frame,
    wherein the first door leaf and the second door leaf are pivotally held relative to each other, an angle of opening between the first door leaf and the second door leaf is adjustable, the first door leaf opens against a direction a direction of passing through the door assembly and the first door leaf and the second door leaf are pivotable in the direction of passing through the door assembly so that the first door leaf closes the door assembly.

11. The means of transport of claim 10, wherein the means of transport is an aircraft, and the space is the cockpit of the aircraft.

12. The means of transport of claim 11, wherein at least one of the first door leaf and the second door leaf comprises at least one predetermined breaking point so that in the case of decompression in the cockpit or in a passenger space pressure equalization becomes possible.

13. The means of transport of claim 10, wherein the maximum angle of opening of the first door leaf relative to the second door leaf is about 60°.

14. The means of transport of claim 10, wherein between the first door leaf and the second door leaf there is a damper in order to ensure closing of the first door leaf and of the second door leaf in a damped manner.

15. The means of transport of claim 10, wherein at least one of the first door leaf and second door leaf comprises a protrusion in order to provide an enlarged passage area.

16. The means of transport of claim 10, wherein the door assembly is a security door assembly.

17. A method for providing access to a space of a means of transport with the use of the door assembly of claim 1 with a first door leaf and a second door leaf, starting from the state in which the first door leaf and the second door leaf are closed, comprising:
- opening the first door leaf against the direction of passing through the door assembly the angle of opening between the first door leaf and the second door leaf being adjustable;
- limiting a maximum angle of opening between the first door leaf and the second door leaf with a limitation device, irrespective of an angle of the second door leaf relative to a door frame;
- pivoting the first door leaf and the second door leaf in the direction of passing through the door assembly so that the first door leaf closes off a door passage; and
- closing the second door leaf.

18. The method of claim 17, further comprising:
- unlocking the second door leaf,
- wherein unlocking takes place after limiting the maximum angle of opening of the first door leaf relative to the second door leaf.

19. The method of claim 18, further comprising:
- locking the first door leaf relative to a position of the second door leaf; and
- releasing the locking mechanism of the first door leaf,
- wherein locking takes place after opening the first door leaf against the direction of passing through the door assembly and before pivoting the first door leaf and the second door leaf.

20. The method of claim 19, wherein releasing the locking mechanism takes place after pivoting the first door leaf and the second door leaf and before closing the second door leaf.

* * * * *